(12) United States Patent
Murphy et al.

(10) Patent No.: US 9,369,543 B2
(45) Date of Patent: Jun. 14, 2016

(54) COMMUNICATION BETWEEN AVATARS IN DIFFERENT GAMES

(75) Inventors: Brian Scott Murphy, Seattle, WA (US); Stephen G. Latta, Seattle, WA (US); Darren Alexander Bennett, Seattle, WA (US); Pedro Perez, Kirkland, WA (US); Shawn C. Wright, Sammamish, WA (US); Relja Markovic, Seattle, WA (US); Joel B. Deaguero, Snohomish, WA (US); Christopher H. Willoughby, Kenmore, WA (US); Ryan Lucas Hastings, Seattle, WA (US); Kevin Geisner, Mercer Island, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 469 days.

(21) Appl. No.: 13/117,522

(22) Filed: May 27, 2011

(65) Prior Publication Data

US 2012/0302350 A1 Nov. 29, 2012

(51) Int. Cl.
*A63F 9/24* (2006.01)
*H04L 29/06* (2006.01)
(Continued)

(52) U.S. Cl.
CPC .............. *H04L 67/38* (2013.01); *A63F 13/10* (2013.01); *A63F 13/12* (2013.01); *A63F 13/5375* (2014.09); *A63F 2300/5533* (2013.01); *A63F 2300/5553* (2013.01); *A63F 2300/57* (2013.01);
(Continued)

(58) Field of Classification Search
CPC ............... A63F 13/12; A63F 13/5375; A63F 2300/5533; A63F 2300/5553; A63F 2300/57; A63F 2300/572
USPC ...................................... 463/42, 43
See application file for complete search history.

(56) References Cited

U.S. PATENT DOCUMENTS

| | | | |
|---|---|---|---|
| 5,926,179 A | 7/1999 | Matsuda et al. | |
| 6,401,122 B1 * | 6/2002 | Matsui et al. | 709/227 |

(Continued)

FOREIGN PATENT DOCUMENTS

| | | |
|---|---|---|
| CN | 101689321 A | 3/2010 |
| CN | 102016781 A | 4/2011 |

(Continued)

OTHER PUBLICATIONS

"PCT Search Report and Written Opinion", Application No. PCT/US2013/024535, (May 3, 2013),10 pages.
(Continued)

*Primary Examiner* — Michael Cuff
(74) *Attorney, Agent, or Firm* — Aaron Chatterjee; Judy Yee; Micky Minhas (57) ABSTRACT

Synchronous and asynchronous communications between avatars is allowed. For synchronous communications, when multiple users are playing different games of the same game title and when the avatars of the multiple users are at the same location in their respective games they can communicate with one another, thus allowing the users of those avatars to communicate with one another. For asynchronous communications, an avatar of a particular user is left behind at a particular location in a game along with a recorded communication. When other users of other games are at that particular location, the avatar of that particular user is displayed and the recorded communication is presented to the other users.

20 Claims, 6 Drawing Sheets

(51) Int. Cl.
*A63F 13/40* (2014.01)
*A63F 13/30* (2014.01)
*H04W 4/04* (2009.01)
*A63F 13/5375* (2014.01)

(52) U.S. Cl.
CPC ..... *A63F2300/572* (2013.01); *A63F 2300/575* (2013.01); *H04W 4/043* (2013.01)

(56) References Cited

U.S. PATENT DOCUMENTS

| | | | |
|---|---|---|---|
| 6,758,754 | B1 | 7/2004 | Lavanchy et al. |
| 7,311,608 | B1 | 12/2007 | Danieli et al. |
| 7,824,253 | B2 | 11/2010 | Thompson et al. |
| 7,903,109 | B2 | 3/2011 | Rurin |
| 7,979,574 | B2 | 7/2011 | Gillo et al. |
| 8,328,639 | B2 | 12/2012 | Nickell et al. |
| 8,562,440 | B2 | 10/2013 | Nickell et al. |
| 8,814,693 | B2 | 8/2014 | Murphy et al. |
| 2002/0086730 | A1 | 7/2002 | Nakai |
| 2004/0143852 | A1 | 7/2004 | Meyers |
| 2004/0186713 | A1* | 9/2004 | Gomas ............ G09B 21/006 704/235 |
| 2005/0137015 | A1 | 6/2005 | Rogers et al. |
| 2006/0121990 | A1 | 6/2006 | O'Kelley et al. |
| 2006/0148545 | A1 | 7/2006 | Rhyne, IV et al. |
| 2007/0038937 | A1* | 2/2007 | Asakawa ........ G06K 9/00463 715/730 |
| 2007/0055728 | A1 | 3/2007 | Shea et al. |
| 2007/0298886 | A1 | 12/2007 | Aguilar et al. |
| 2008/0146338 | A1 | 6/2008 | Bernard et al. |
| 2008/0229215 | A1 | 9/2008 | Baron et al. |
| 2008/0261697 | A1 | 10/2008 | Chatani |
| 2008/0318687 | A1 | 12/2008 | Backer et al. |
| 2009/0088233 | A1 | 4/2009 | O'Rourke et al. |
| 2009/0111576 | A1 | 4/2009 | Ostergren et al. |
| 2009/0118015 | A1 | 5/2009 | Chang et al. |
| 2009/0172574 | A1 | 7/2009 | Jania et al. |
| 2009/0227368 | A1 | 9/2009 | Wyatt |
| 2009/0253512 | A1 | 10/2009 | Nickell et al. |
| 2009/0254842 | A1 | 10/2009 | Leacock et al. |
| 2009/0309891 | A1 | 12/2009 | Karkanias et al. |
| 2010/0035692 | A1 | 2/2010 | Reville et al. |
| 2010/0064307 | A1* | 3/2010 | Malhotra et al. ............... 725/24 |
| 2010/0081504 | A1 | 4/2010 | Fujisawa |
| 2010/0113148 | A1 | 5/2010 | Haltovsky et al. |
| 2010/0227682 | A1 | 9/2010 | Reville et al. |
| 2010/0229235 | A1 | 9/2010 | Dawson et al. |
| 2010/0251141 | A1* | 9/2010 | Sabin et al. ................... 715/758 |
| 2010/0262958 | A1 | 10/2010 | Clinton et al. |
| 2010/0287510 | A1* | 11/2010 | Cragun ............... G09B 21/00 715/848 |
| 2010/0321389 | A1 | 12/2010 | Gay et al. |
| 2011/0178978 | A1 | 7/2011 | Parunak et al. |
| 2011/0201414 | A1* | 8/2011 | Barclay et al. ................. 463/25 |
| 2011/0219422 | A1* | 9/2011 | Shen et al. ....................... 726/1 |
| 2011/0244954 | A1 | 10/2011 | Goldman et al. |
| 2011/0298827 | A1 | 12/2011 | Perez |
| 2012/0009998 | A1 | 1/2012 | Bae et al. |
| 2012/0021825 | A1 | 1/2012 | Harp et al. |
| 2012/0021836 | A1 | 1/2012 | Shiraku |
| 2012/0030249 | A1 | 2/2012 | Schrag et al. |
| 2012/0050286 | A1 | 3/2012 | Yockey |
| 2012/0054337 | A1* | 3/2012 | Moritz et al. ................. 709/224 |
| 2012/0110099 | A1 | 5/2012 | Fujihara et al. |
| 2012/0151060 | A1 | 6/2012 | Dawson et al. |
| 2012/0172131 | A1 | 7/2012 | Boswell et al. |
| 2012/0233076 | A1* | 9/2012 | Sutcliffe et al. ............... 705/50 |
| 2012/0264509 | A1* | 10/2012 | Bortnik et al. ................. 463/29 |
| 2012/0289328 | A1 | 11/2012 | Harp et al. |
| 2012/0302350 | A1 | 11/2012 | Murphy et al. |
| 2012/0302351 | A1 | 11/2012 | Murphy et al. |
| 2013/0203509 | A1 | 8/2013 | Reed |

FOREIGN PATENT DOCUMENTS

| | | |
|---|---|---|
| EP | 1145749 A2 | 10/2001 |
| EP | 1219330 | 7/2002 |
| EP | 1693092 A2 | 8/2006 |
| JP | 2004064398 | 2/2004 |
| JP | 2006141702 | 6/2006 |
| JP | 2010009512 | 1/2010 |
| KR | 1020050051985 | 6/2005 |
| KR | 20060074951 | 7/2006 |
| KR | 20090003544 | 1/2009 |
| KR | 1020090076319 | 7/2009 |
| WO | WO-2007022487 | 2/2007 |

OTHER PUBLICATIONS

"In-Game Support for Non-Added Games", Retrieved from: <http://raptr.com/forums/showthread.php?t=13094> Mar. 29, 2011, 2 pages.

Bennerstedt, Ulrika "Avatars & Interaction in Gaming: Dysfunctional Interaction or a Practice of Players", *Department of Education, Goteboord University*, Available at <http://www.learnit.org.gu.se/digitalAssets/889/889141_bennerstedt.pdf>,(Jun. 2007), pp. 1-14.

Knutsson, Bjorn et al., "Peer-to-Peer Support for Massively Multiplayer Games", *In Proceedings of IEEE INFOCOM 2004*, Available at <http://citeseerx.ist.psu.edu/viewdoc/download-?doi=10.1.1.1.3588&rep=rep1&type=pdf >,(Mar. 2004), 12 pages.

Lim, Sohye et al., "Response to Interactive Game Characters Controlled by a Computer versus Other Players", *Department of Communication, Stanford University*, Available at <http://www.stanford.edu/~reeves/Byron_Reeves/Home_files/Agent%20Avatar%20Physio%20Responses.pdf>, (May 2007), pp. 1-31.

Logan, Brian "Keeping in Touch: Agents Reporting from Collaborative Virtual Environments", *American Association for Artifical Intelligence*, Available at <http://citeseerx.ist.psu.edu/viewdoc/download;jsessionid=037A64C295DD3C1FB7B7DF88D0B5D864?doi=10.1.1.104.1879&rep=rep1&type=pdf>,(2002), pp. 62-67.

"Non-Final Office Action", U.S. Appl. No. 13/366,046, filed Dec. 21, 2012, 9 pages.

"PCT Search Report and Written Opinion", Application No. PCT/US2012/039766, (Dec. 20, 2012), 9 pages.

De Chiara, Rosario et al., "Real Positioning in Virtual Enviroments Using Using Game Engines", *Eurographics Italian Chapter Conderence 2006*, retrieved from <http://citeseerx.ist.psu.edu/viewdoc/download?doi=10.1.1.66.7024&rep=rep1&type=pdf on Nov. 15, 2011,(2007), 6 pages.

Nguyen, et al., "On the Provision of Immersive Audio Communication to Massively Multi-player Online Games", Retrieved at >>http://ro.uow.edu.au/cgi/viewcontent.cgi?article=1183&context=infopapers&sei-redir=1#search=%22hearing+voice+and+avatars+and+multi+playe-Fgaming%22>>, Proceedings of Ninth International Symposium on Computers and Communications, vol. 2, 2004, pp. 8.

Lin, et al., "Sync-MS: Synchronized Messaging Service for Real-Time Multi-Player Distributed Games", Retrieved at <<http://www.bell-labs.com/user/kguo/papers/syncms-icnp02.pdf>>, Proceedings of 10th IEEE International Conference on Network Protocols, Nov. 12-15, 2002, pp. 10.

"PCT Search Report and Written Opinion", Application No. PCT/US2012/039769, (Jan. 2, 2013), 9 pages.

"Non-Final Office Action", U.S. Appl. No. 13/117,862, filed Dec. 5, 2013, 10 pages.

"Notice of Allowance", U.S. Appl. No. 13/117,862, filed Mar. 27, 2014, 12 pages.

"Corrected Notice of Allowance", U.S. Appl. No. 13/117,862, filed Jul. 2, 2014, 2 pages.

"Final Office Action", U.S. Appl. No. 13/366,046, filed May 21, 2014, 14 pages.

"Supplemental Notice of Allowance", U.S. Appl. No. 13/117,862, filed May 29, 2014, 2 pages.

(56) References Cited

OTHER PUBLICATIONS

"Architectural Modeling of Distributed Interactive Systems: The MUD Game Case-Study", Retrieved from the Internet: URL http://www.cs.le.uk/people/na80/LLAW4MUD-GAME.pdf, Apr. 30, 2005, 36 pages.
"European Search Report", EP Application No. 12793597.1, Oct. 13, 2014, 3 pages.
"Foreign Notice of Allowance", EP Application No. 12794059.1, Dec. 3, 2014, 8 pages.
"Non-Final Office Action", U.S. Appl. No. 13/366,046, filed Jan. 16, 2015, 14 pages.
"Foreign Office Action", EP Application No. 12793597.1, Nov. 10, 2014, 8 pages.
Microsoft Corporation, "Avatar Definition," Microsoft Computer Dictionary, 5th Edition, May 31, 2002, 4 pages.
International Bureau of WIPO, International Preliminary Report on Patentability Issued in Application No. PCT/US2012/039766, Dec. 2, 2013, WIPO, 5 pages.
United States Patent and Trademark Office, Corrected Notice of Allowability Issued in U.S. Appl. No. 13/117,862, filed Jul. 2, 2014, 2 pages.
International Bureau of WIPO, International Preliminary Report on Patentability Issued in Application No. PCT/US2013/024535, Aug. 5, 2014, WIPO, 6 pages.
European Patent Office, Supplementary European Search Report Issued in Application No. 12794059.1, Oct. 30, 2014, 2 pages.
The State Intellectual Property Office of China, First Office Action and Search Report Issued in Chinese Patent Application No. 201280025596.X, Dec. 25, 2015, China, 16 pages.
The State Intellectual Property Office of China, First Office Action and Search Report Issued in Chinese Patent Application No. 201280025688.8, Dec. 25, 2015, China, 14 pages.
European Patent Office, Supplementary Search Report Issued in European Patent Application No. 13744296.8, Feb. 10, 2016, Germany, 4 pages.
European Patent Office, Office Action Issued in European Patent Application No. 13744296.8, Feb. 24, 2016, Germany, 5 pages.

* cited by examiner

COMMUNICATION BETWEEN AVATARS IN DIFFERENT GAMES

BACKGROUND

Online gaming services allow users to play games by themselves, or to play games together with one or more of their friends. While playing games together with friends is very enjoyable for many users, it is not without its problems. One such problem is that it can be difficult for users to communicate with one another when playing games due to the different times they may play the game and/or different rates at which they may progress through the game. Such difficulties can be frustrating for users, reducing the user friendliness of the games.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, an indication of a location in a game of a game title where an avatar representing a first user is left is obtained, and a determination is made as to when an avatar of a second user in a second game of the same game title is at that same location. When the avatar of the second user is at that same location, a recorded communication from the first user is presented in the second game via the avatar of the first user.

In accordance with one or more aspects, a location of an avatar of a first user in a first game of a game title being played by the first user is identified, and a location of an avatar of a second user in a second game of the same game title being played by the second user is identified. A determination is made as to when the avatar of the first user and the avatar of the second user are at the same location, and communication between the avatar of the first user and the avatar of the second user is allowed only when the avatar of the first user and the avatar of the second user are at the same location.

BRIEF DESCRIPTION OF THE DRAWINGS

The same numbers are used throughout the drawings to reference like features.

DETAILED DESCRIPTION

Communication between avatars in different games is discussed herein. Communication between avatars can be synchronous or asynchronous. For synchronous communication, when multiple users are playing different games of the same game title and when the avatars of the multiple users are at the same location in the game, the avatars (and thus the users having those avatars) can communicate with one another. This communication can take a variety of different forms, such as audible communications, physical gestures of the avatars, transferring of items between the avatars, and so forth. For asynchronous communication, an avatar of a particular user is left behind at a particular location in a game along with a recorded communication (e.g., audible communications, physical gestures of avatars, transferring of items, etc.). When other users of other games of the same game title are at that particular location, the avatar of that particular user is displayed and the users are presented with the recorded communication.

Figure 1:
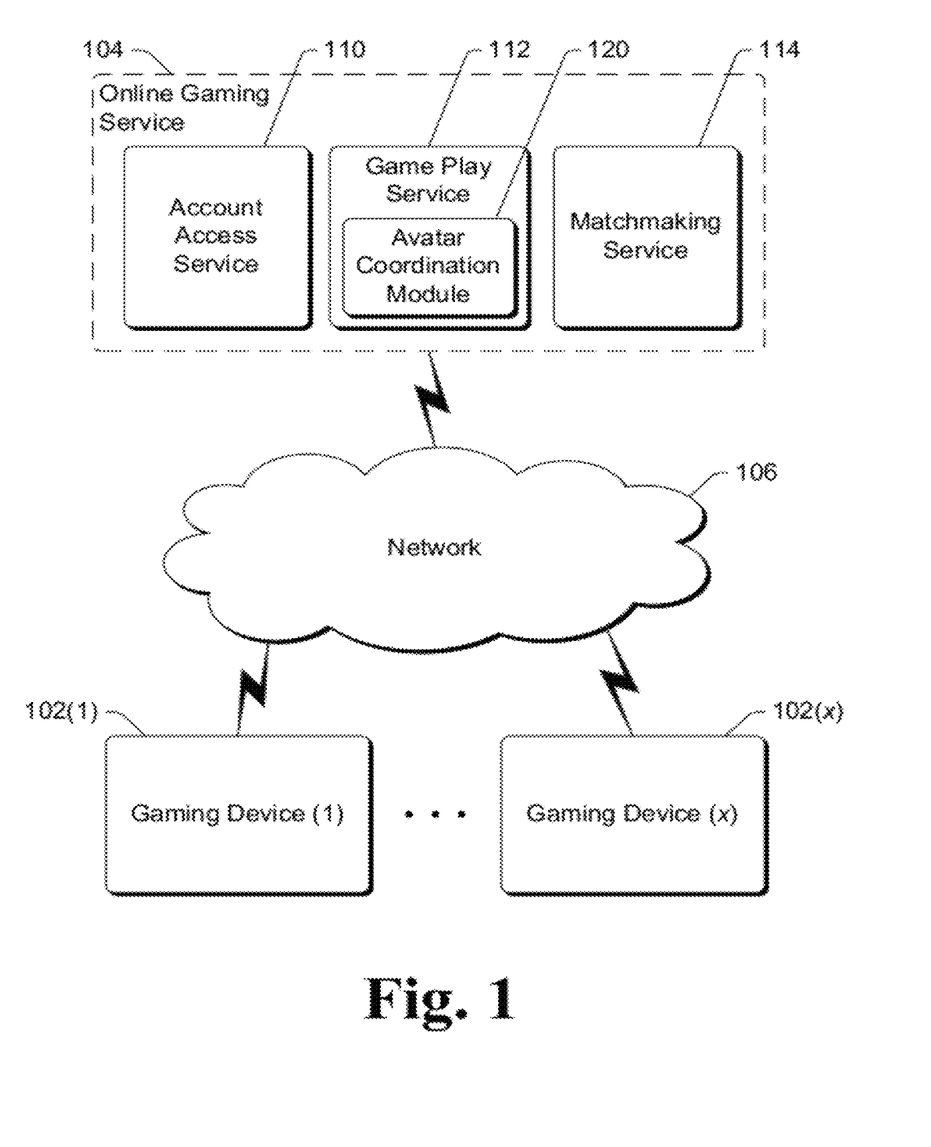
FIG. 1 illustrates an example system implementing the communication between avatars in different games in accordance with one or more embodiments.

FIG. 1 illustrates an example system 100 implementing the communication between avatars in different games in accordance with one or more embodiments. System 100 includes multiple (x) gaming devices 102 and an online gaming service 104 that can communicate with one another via a network 106. Network 106 can be a variety of different networks, including the Internet, a local area network (LAN), a wide area network (WAN), a personal area network (PAN), a phone network, an intranet, other public and/or proprietary networks, combinations thereof, and so forth.

Each gaming device 102 can be a variety of different types of devices that allow users to play games (such as sports games, strategy games, adventure games, simulation games, and so forth). Different ones of gaming devices 102 can be the same or different types of devices. For example, a gaming device 102 can be a game console, a cellular or other wireless phone, a television or other display device, a set-top box communicatively coupled to a display device, a desktop computer, a laptop or netbook computer, a tablet or notepad computer, a mobile station, an entertainment appliance, an automotive computer, and so forth.

Online gaming service 104 facilitates playing of one or more different games by users of gaming devices 102. Gaming service 104 is referred to as being an online service due to gaming devices 102 accessing service 104 (and/or other gaming devices 102) via network 106. Online gaming service 104 includes an account access service 110, a game play service 112, and optionally a matchmaking service 114, each of which can communicate with one another. Services 110, 112, and 114 can communicate with one another within online gaming service 104 and/or via gaming devices 102.

Account access service 110 provides various functionality supporting user accounts of online gaming service 104. Different users and/or gaming devices 102 typically have different accounts with online gaming service 104, and can log into their accounts via account access service 110. A user or gaming device 102 logs into an account providing credential information, such as an id (e.g., user name, email address, etc.) and password, a digital certificate or other data from a smartcard, and so forth. Account access service 110 verifies or authenticates the credential information, allowing a user or gaming device 102 to access the account if the credential information is verified or authenticated, and prohibiting the user or gaming device 102 from accessing the account if the credential information is not verified or is not authenticated. Once a user's credential information is authenticated, the user can use the other services provided by online gamine service 104. Account access service 110 can also provide various additional account management functionality, such as permitting changes to the credential information, establishing new accounts, removing accounts, and so forth.

Game play service 112 provides various functionality supporting playing of one or more different games by users of gaming devices 102. Different game titles can be supported by game play service 112 (e.g., one or more different sports game titles, one or more different strategy game titles, and so forth). A game title refers to a particular set of instructions that implement a game when executed (e.g., a set of instructions for a tennis game from a particular vendor, a set of instructions for a particular racing game from a particular vendor, etc). A particular running of a game title is also referred to as a game. Multiple games of the same game title can be played concurrently by different users, each game being a separate running of the game title. Games can be run and played as single-player games in which a single user of a gaming device 102 is playing the game and controlling one or more characters in the game, with other characters in the game being controlled by the game itself (these other characters also being referred to as non-player-characters). Games can also be run and played as multi-player games in which multiple users of one or more gaming devices 102 are playing the same game and each user is controlling one or more characters in the game. In multi-player games one or more additional characters can also be controlled by the game itself.

A game is typically run by executing one or more programs. The programs that are executed to run these games can be run on gaming devices 102 and/or game play service 112. Gaming devices 102 can execute one or more programs for the game, communicating with game play service 112 to facilitate communication between users of gaming devices 102 while playing games and/or to provide or obtain additional data (and/or programs) for playing the game. Alternatively (or additionally), game play service 112 can execute one or more programs for the game, receiving inputs from users of gaming devices 102 and returning data indicating outputs to be generated for display or other presentation to the users of gaming devices 102.

In one or more embodiments, games are programs executed on gaming devices 102 and game play service 112 manages communication between different gaming devices 102. In other embodiments, games are programs executed on gaming devices 102 and game play service 112 facilitates establishing communication between different gaming devices 102. After communication between two gaming devices 102 is established, communication can be made between those two gaming devices 102 without involving game play service 112.

Game play service 112 includes an avatar coordination module 120. While playing a game, there is an object in the game that represents the user, referred to as an avatar. An avatar is oftentimes a graphical representation of the user, but can alternatively have a variety of other forms, such as a vehicle, an orb, and so forth. Avatar coordination module 120 facilitates sharing of avatars of different users across one or more games and/or communication between avatars across one or more games. Avatars can be shared across different game titles as well as across different games of the same game title. Similarly, communication between avatars can occur across different game titles as well as across different games of the same game title. Additionally, the avatar of a user can be shared while the user is logged in to online gaming service 110 and/or when the user is not logged into online gaming service 110. This sharing of avatars is discussed in more detail below. Although illustrated as being included as part of game play service 112, avatar coordination module 120 can alternatively be implemented at least in part in gaming devices 102.

Matchmaking service 114, when included in online gaming service 104, provides various functionality facilitating the finding of other users with which a user of gaming device 102 can play a game. Matchmaking service 114 identifies other users with which a particular user can play a game in a variety of different manners, such as based on physical locations of the gaming devices 102, skill levels of the users of gaming devices 102, and/or other characteristics of gaming devices 102 and/or the users of gaming devices 102. Matchmaking service 114 can identify other users based on user accounts that account access service 110 is aware of, based on users logged into their accounts at a particular time (e.g., as indicated by account access service 110), based on accounts from other services (e.g., social networking services that matchmaking service 114 can communicate with), and so forth. Matchmaking service 114 can identify other users with which a user of gaming device 102 can play a game across the same and/or different types of gaming devices 102 (e.g., one or more users of a desktop computer and one or more users of a game console, one or more users of a phone and one or more users of a game console, etc.). Similarly, matchmaking service 114 can identify other users with which a user of gaming device 102 can play a game across the same and/or different services (e.g., one or more users of game play service 112 and one or more users of another service of online gaming service 104). Avatar coordination module 120 can also facilitate the finding of other users with which a user of gaming device 102 can play a game based on social graphs of the users as discussed in more detail below. Any finding of other users by matchmaking service 114 is in addition to avatar coordination module 120 finding other users.

Each of services 110, 112, and 114 can be implemented using one or more computing devices. Typically these computing devices are server computers, but any of a variety of different types of computing devices can alternatively be used (e.g., any of the types of devices discussed above with reference to gaming device 102). Each of services 110, 112, and 114 can be implemented using different computing devices, or alternatively one or more of services 110, 112, and 114 can be implemented using the same computing device.

Additionally, although services 110, 112, and 114 are illustrated as separate services, alternatively one or more of these services can be implemented as a single service. For example, game play service 112 and matchmaking service 114 can be implemented as a single service. Furthermore, the functionality of one or more of services 110, 112, and 114 can be separated into multiple services. In addition, the functionality of online gaming service 104 can be separated into multiple services. For example, online gaming service 104 may include account access service 110 and game play service 112, and a different service (e.g., a social networking service) can include matchmaking service 114.

Figure 2:
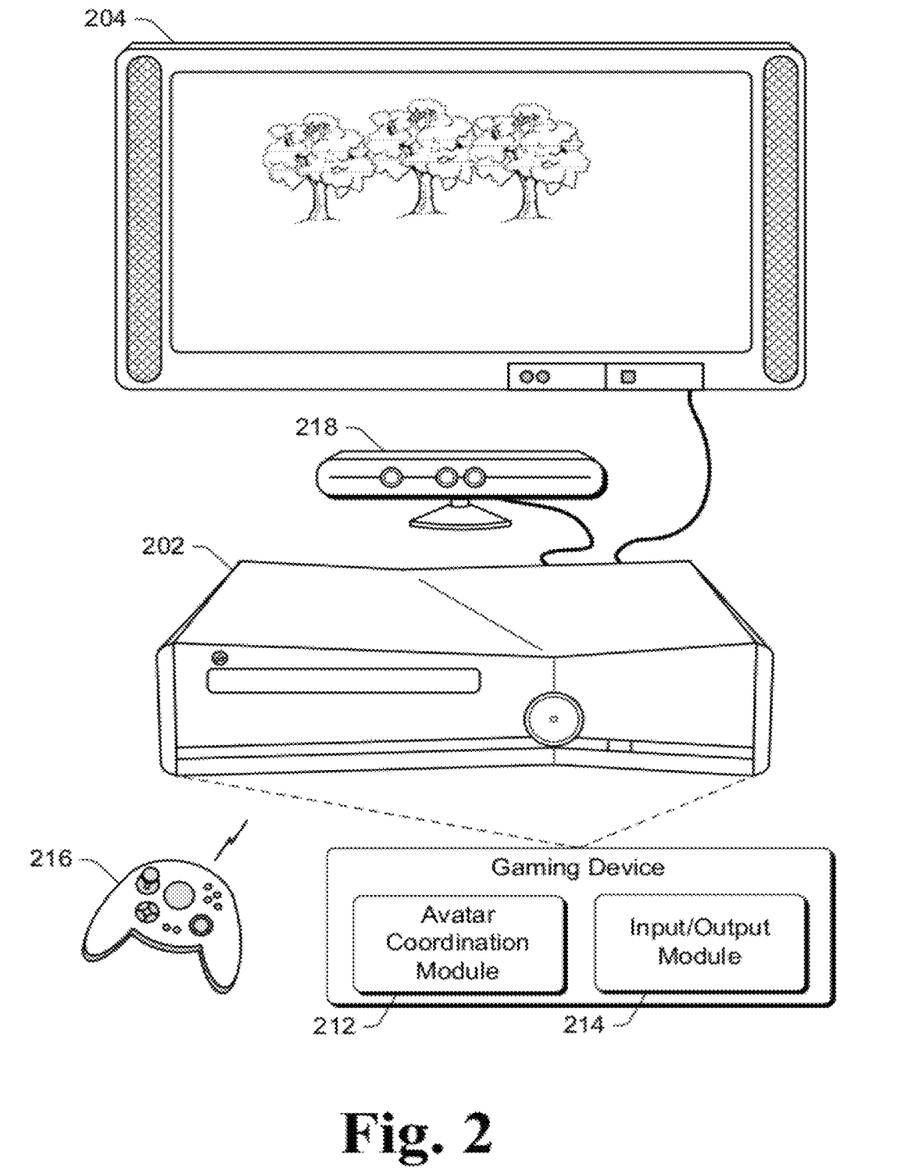
FIG. 2 illustrates an example gaming device and display in additional detail in accordance with one or more embodiments.

FIG. 2 illustrates an example gaming device and display in additional detail in accordance with one or more embodiments. FIG. 2 illustrates a gaming device 202, which can be a gaming device 102 of FIG. 1, coupled to a display device 204 (e.g., a television). Gaming device 202 and display device 204 can communicate via a wired and/or wireless connection. Gaming device 202 includes an avatar coordination module 212 and an input/output (I/O) module 214. Avatar coordination module 212 is analogous to avatar coordination module 120 of FIG. 1, although is illustrated as implemented in gaming device 202 rather than in an online gaming service.

Input/output module 214 provides functionality relating to recognition of inputs and/or provision of (e.g., display or other presentation of) outputs by gaming device 202. For example, input/output module 214 can be configured to receive inputs from a keyboard or mouse, to identify gestures and cause operations to be performed that correspond to the gestures, and so forth. The inputs can be detected by input/output module 214 in a variety of different ways.

Input/output module 214 can be configured to receive one or more inputs via touch interaction with a hardware device, such as a controller 216 as illustrated. Touch interaction may involve pressing a button, moving a joystick, movement across a track pad, use of a touch screen of display device 204 or controller 216 (e.g., detection of a finger of a user's hand or a stylus), other physical inputs recognized by a motion detection component (e.g., shaking a device, rotating a device, etc.), and so forth. Recognition of the touch inputs can be leveraged by input/output module 214 to interact with a user interface output by gaming device 202, such as to interact with a game, change one or more settings of gaming device 202, and so forth. A variety of other hardware devices are also contemplated that involve touch interaction with the device. Examples of such hardware devices include a cursor control device (e.g., a mouse), a remote control (e.g. a television remote control), a mobile communication device (e.g., a wireless phone configured to control one or more operations of gaming device 202), and other devices that involve touch on the part of a user or object.

Input/output module 214 can also be configured to receive one or more inputs in other manners that do not involve touch or physical contact. For example, input/output module 214 can be configured to receive audio inputs through use of a microphone (e.g., included as part of or coupled to gaming device 202). By way of another example, input/output module 214 can be configured to recognize gestures, presented objects, images, and so forth through the use of a camera 218. The images can also be leveraged by gaming device 202 to provide a variety of other functionality, such as techniques to identify particular users (e.g., through facial recognition), objects, and so on.

Gaming device 202 can also leverage camera 218 to perform skeletal mapping along with feature extraction of particular points of a human body (e.g., 48 skeletal points) to track one or more users (e.g., four users simultaneously) to perform motion analysis. For instance, camera 218 can capture images that are analyzed by input/output module 214 or a game running on gaming device 202 to recognize one or more motions made by a user, including what body part is used to make the motion as well as which user made the motion. The motions can be identified as gestures by input/output module 214 or the running game to initiate a corresponding operation.

Figure 3:
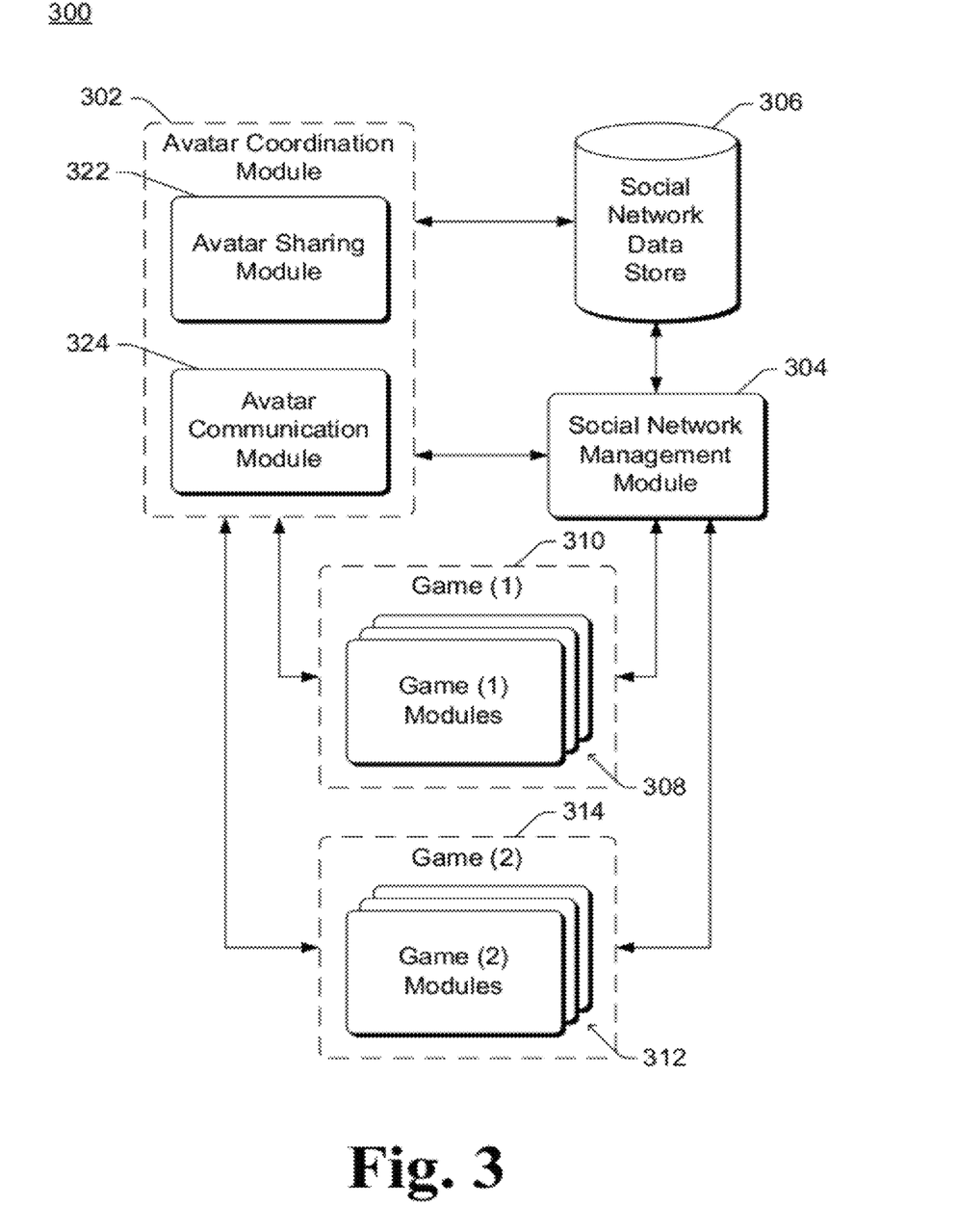
FIG. 3 illustrates another example system implementing the communication between avatars in different games in accordance with one or more embodiments.

FIG. 3 illustrates an example system 300 implementing the communication between avatars in different games in accordance with one or more embodiments. System 300 includes an avatar coordination module 302 (which can be an avatar coordination module 120 of FIG. 1 or an avatar coordination module 212 of FIG. 2), a social network management module 304, a social network data store 306, one or more game modules 308 of a game 310, and one or more game modules 312 of a game 314.

Social network management module 304 manages social network data for users of system 300 (e.g., users having accounts with online gaming service 104 of FIG. 1), including identifying other users in a user's social graph. Different social network data is maintained in social network data store 306 for different users of system 300. For each user of system 300, a record is maintained of the friends of that user. Friends can take a variety of different forms, such as personal acquaintances, work acquaintances, family members, and so forth. Social network management module 304 allows users to identify other users as friends and stores an indication of those friends for each user in data store 306. A user can identify a particular user that is a friend in different manners, such as by entering a user name or account identifier for the particular user, selecting the particular user from a list, and so forth. Another user can optionally be indicated as a friend of a particular user only if that other user confirms that he or she desires to be a friend of that particular user. Friends of a particular user can also be identified in other manners, such as by accessing a social networking service (e.g., external to online gaming service 104 of FIG. 1), receiving indications of friends from other components or modules, and so forth.

The social graph of a user refers to friends of that user, and optionally one or more additional levels or steps of friends. Each level or step refers to a group of friends of each user in the previous level or step. For example, the first level or step is friends of the user, the second level or step is friends of the user's friends, the third level or step is friends of the friends of the user's friends, and so forth. Thus, the social graph for a particular user can include other users known to that particular user, as well as optionally additional users (e.g., a friend of a friend). The users in a social graph of a particular user are also referred to as being associated with that particular user. Social network management module 304 allows the social graphs of users to be made available to avatar coordination module 302, and optionally to other modules or programs (e.g., to one or more games).

Game modules 308 are modules of a game 310, and game modules 312 are modules of a game 314. In the illustrated example, games 310 and 314 are games being played by different users. Games 310 and 314 can be different game titles (e.g., one can be a sports game and another an adventure game), or alternatively can be different games of the same game title.

Avatar coordination module 302 includes an avatar sharing module 322 and an avatar communication module 324. Avatar sharing module 322 provides functionality allowing, for a particular user, avatars of other users to be displayed in a game that particular user is playing. Which other users' avatars can be displayed in the game that particular user is playing is based at least in part on the data in social network data store 306, as discussed in more detail below. Avatar communication module 324 provides functionality allowing communication between avatars of different users across different game titles and/or different games of the same game title. This communication can be synchronous communication or asynchronous communication, as discussed in more detail below.

An avatar is an object representing a user (and/or controlled by a user) in a game. An avatar is oftentimes a graphical representation of a user, having the appearance of a person and may include similar characteristics as the user (e.g., hair color, height, weight, etc.) or alternatively different characteristics. Alternatively, an avatar can be other objects other than a person, such as a vehicle (e.g., a car or a spaceship), a geometric shape (e.g., an orb), and so forth. Each user has his or her own avatar, and different users' avatars can have different characteristics.

System 300 can be implemented in a variety of different devices. For example, system 300 can be implemented in gaming devices 102 of FIG. 1, in online gaming service 104 of FIG. 1, or partly in gaming devices 102 and partly in online gaming service 104.

In one or more embodiments avatar coordination module 302 is implemented separately from, and as part of a service made available to, games 310 and 314. Alternatively, avatar coordination module 302 can be implemented (at least in part) in games 310 and 314. Thus, for example, modules 308 can include avatar sharing module 322 and/or avatar communication module 324, or can implement at least part of the functionality discussed herein as performed by avatar sharing module 322 and/or avatar communication module 324. Similarly, by way of example, modules 312 can include avatar sharing module 322 and/or avatar communication module 324, or can implement at least part of the functionality discussed herein as performed by avatar sharing module 322 and/or avatar communication module 324.

Avatar communication module 324 provides functionality allowing synchronous and/or asynchronous communication between avatars of different users across different game titles and/or different games of the same game title. Asynchronous communication between avatars of different users refers to communication between avatars of different users when the avatars are not at the same location while one or more of the users are playing the game. The different users can be playing different games of the same game title but their avatars are at different locations in their respective games, or one of the users may not be currently playing the game. Synchronous communication between avatars of different users refers to communication between avatars of different users when avatars are at the same location while the users are playing different games of the same game title.

Reference is made herein to avatars being at the same location. Whether two avatars are at the same location can be determined in a variety of different manners. Two avatars can be referred to as being at the same location if the locations of those avatars in their respective games are within a threshold distance of one another. This distance can be defined in different manners, such as a particular number of feet or miles within the game. For example, if the location of the avatar (e.g., latitude and longitude of the avatar within the game) of one user in the game he or she is playing is within a particular number of feet of the location of the avatar of another user in the game that other user is playing, then the avatars of the two users are at the same location. This distance can also be defined in other manners, such as in terms of line of sight within the game or audible range within the game (e.g., the two avatars are within the threshold distance of one another if the two avatars are visible to one another, or can hear one another), in terms of whether avatars are in the same room or building, and so forth. For example, if the avatar of one user in the game he or she is playing is in a particular room, and the avatar of another user in the game that other user is playing is in that particular room, then the avatars of the two users are at the same location.

Two avatars can also be referred to as being at the same location if those avatars are at a same place or level of a game, are facing a same (or similar) challenge in a game, or if the users represented by those avatars are performing the same function or having a same experience. For example, two avatars can be referred to as being at the same location if the two avatars are in a same store, in a same spaceship, in a same level of a game, and so forth. By way of another example, two avatars can be referred to as being at the same location if the users represented by those avatars are navigating through the same menus or portions of a user interface of the game, are playing the same (or similar) mini-game or attempting to overcome the same (or similar) challenge, and so forth.

The other users with which communication is allowed (via their avatars) are determined based on the social graph of the users. The number of levels or steps included in the social graph of a user can vary, and can be determined based on the users. For example, the users can set configuration values indicating how many levels or steps are to be included in their respective social graphs. Synchronous communication and/or asynchronous communication between avatars of two users is allowed if each of the two users is in the social graph of the other. Alternatively, one-way communication (synchronous communication and/or asynchronous communication) can optionally be allowed if the communicating user is included in the social graph of the recipient of the communication. For example, if user A is in user B's social graph but user B is not in user A's social graph, then user A's avatar is allowed to provide communications to user B's avatar, but user B's avatar is not allowed to provide communications to user A's avatar.

The game modules 308 and/or 312 support presentation of avatars of other users. The avatars of other users can be maintained in a data store accessible to avatar sharing module 322, such as social network data store 306 or another store. Avatar sharing module 322 can obtain the avatar of another user to be displayed and provide that avatar to game modules 308 and/or 312. Alternatively, avatar sharing module 322 can provide to a game module 308 and/or 312 an identifier of the user whose avatar is to be displayed, and the game 310 and/or 314 itself can in turn obtain the avatar of the identified user. These avatars of other users can be moved or animated in various ways, analogous to the movement or animation of other avatars (e.g. the avatar of the user playing the game, or avatars of non-player-characters) in the game.

For synchronous communication between avatars of different users, system 300 identifies the locations of the avatars of the different users within the respective games of the game titles those users are playing. The locations of these avatars can be identified and monitored by modules of the games (e.g., game modules 308 and/or 312) and/or by avatar coordination module 302 (e.g., the games can provide location information for the users to avatar communication module 324). For example, coordinates of the avatars within the game can be tracked (e.g., latitude and longitude coordinates within the game), areas within the game where the avatars are located can be tracked (e.g., rooms or buildings that the avatars are located in, or sectors that the avatars are located in), and so forth. Given the locations of the avatars of the different users, avatar communication module 324 can readily determine when the avatars of the different users are at the same location.

When the avatars of the different users are at the same location, avatar communication module 324 facilitates communication between the avatars. The avatars of the users can be obtained (e.g., from avatar sharing module 322) and displayed in each other's games. The communication between avatars can take various forms, and can be any type of data desired by the developer of the game. For example, the communication can be audible communication, physical gestures (gestures of the avatar), displaying of pictures (e.g., of a user playing a game), displaying of videos (e.g., of a user playing a game), displaying of user-generated content (e.g., content crafted in a game), and so forth. The communication can also optionally include transferring of items or data, such as one avatar handing or otherwise transferring a potion, a health pack, equipment, a picture, a video, user-generated content, and so forth to another avatar. In one or more embodiments, communications input by each user are provided to avatar communication module 324, which in turn provides those communications to the game being played by the other user. Alternatively, avatar communication module 324 can facilitate establishing a communication channel between two games, allowing the modules of the different games of the same game title to communicate with one another without passing through avatar communication module 324.

For example, assume user A and user B are both online (e.g., logged into the same online gaming service, such as online gaming service 104 of FIG. 1) playing different games of the same game title (user A is playing game 310 and user B is playing game 314), and are identified as users for which communication between their avatars is allowed. When user A and user B are identified as being at the same location (e.g., in the same room, within a threshold number of feet of one another, etc.), avatar communication module 324 allows communication between the avatars of user A and user B (and thus allows communication between user A and user B). User A's avatar (e.g., obtained from avatar sharing module 322) is displayed in the game being played by user B, and user B's avatar (e.g., obtained from avatar sharing module 322) is displayed in the game being played by user A. User A and user B continue to play their own games (they do not join the same game), but can communicate with one another while they remain at the same location.

Continuing with this example, audible inputs received from user A are received at a game module 308 of game 310 being played by user A and provided to a game module 312 of game 314 being played by user B, which in turn plays back those audible inputs on user B's gaming device. In game 314 being played by user B, user A's avatar can also be animated so as to appear to be talking (corresponding to the audible inputs being played back). Similarly, if user A controls his or her avatar to perform a particular gesture or other physical motion, data describing this gesture or motion is provided from a game module 308 of game 310 being played by user A to a game module 312 of game 314 being played by user B, which in turn animates user A's avatar (based on the received data) in game 314 being played by user B. Similarly, if user A controls his or her avatar to hand or otherwise transfer an item to user B's avatar, data describing this handing or transfer is provided from a game module 308 of game 310 being played by user A to a game module 308 of game 310 being played by user B, which in turn animates user A's avatar (based on the received data) in game 314 being played by user B to hand or transfer the item to user B's avatar. Analogously, user B can provide audible inputs, control his or her avatar to perform particular gestures or other motions, and so forth. Data for such inputs, gestures, motions, etc. are provided from a module 312 of game 314 to a game module 308 of game 310 for presentation in game 310. Thus, by being in the same location in different games of the same game title, user A and user B are able to communicate with one another across their different games.

In addition to facilitating communication between the avatars, avatar communication module 324 can facilitate providing additional items or benefits to one or both avatars at the same location. A module of the game being played by each user (or alternatively one user) receives an indication of when the avatars are at the same location and provides additional items or benefits as appropriate for the game. The particular items or benefits provided can vary based on the desires of the developer of the game. For example, when both avatars are at the same location one or both avatars may receive a health boost, additional points, additional money, and so forth. The additional items or benefits can be dependent on the actions of one or both avatars (e.g., continuing with the previous example, user A's avatar is fighting enemies and user B's avatar, when at the same location as user A's avatar, receives an item or benefit for each enemy that user A's avatar defeats). Alternatively, the additional items or benefits can be provided simply due to both avatars being at the same location.

It should be noted that for synchronous communication between avatars of different users, the different users are running different games of the same game title. Each user has their own experience with their own game—the two users are not joined into playing the same game. However, while the avatars of the two users stay at the same location, the avatars of the two users (and thus the two users) can communicate with one another.

Asynchronous communication between avatars of different users refers to communication between avatars of different users when the avatars are not at the same location while one or more of the users are playing the game. Asynchronous communication between avatars of different users includes situations in which the different users are playing different games of the same game title but their avatars are not at the same location. Asynchronous communication between avatars of different users also includes situations in which the different users are not playing different games of the same game title, such as where the users are playing games of two different game titles or one user is playing the game and the other user is not currently online (e.g., not currently logged into the same online gaming service, such as online gaming service 104 of FIG. 1).

For asynchronous communication between avatars of different users, an avatar of the communicating user is left (also referred to as left behind) at a particular location in a game. A location in a game can take different forms analogous to the discussion above regarding two avatars being at the same location. For example, the location in a game can be a latitude and longitude of the avatar within the game, a room or building in a game, a place or level of a game, a menu or mini-game, and so forth.

Leaving the avatar at a particular location in a game refers to indicating a location where that avatar will be displayed to other users when playing the game. The same avatar can be left at multiple locations, and a user continues to control and move his or her avatar in the game despite the avatar having been left at a particular location. Thus, leaving the avatar at a particular location can also be referred to as leaving a copy of the avatar at that particular location. The particular location can be determined in different manners, such as in response to a user request (e.g., a particular user playing a game can provide a request to the game to have his or her avatar left at a particular location, such as the location of the avatar in the game when the request is received by the game), in response to a location identified by a module of the game (e.g., a module of the game indicating that the avatar of a user playing a game is to be left when the avatar is at a particular location), and so forth. A record of this particular location is maintained in a data store accessible to avatar communication module 324 and/or a game (e.g., game 310 or game 314), such as social network data store 306 or another store.

When an avatar of a user is left behind, the user leaving the avatar (also referred to as the communicating user) can record a variety of different communications. The communication can take various forms and can be any type of data desired by the developer of the game, analogous to the discussion above regarding synchronous communications. The communication can be, for example, audible communication, physical gestures, transferring of items, and so forth. However, rather than communicating with another user that is online and playing a different game of the same game title, for asynchronous communications the communication is recorded for later playback to another user.

Additionally, in one or more embodiments the communication can also include data indicating actions that the user's avatar performed along a particular path. For example, the user can provide various inputs requesting that the action of his or her avatar along a particular path (e.g., along a particular race track, when overcoming a particular obstacle, etc) be recorded. The game the user is playing records data representing these actions and saves the data so that the user's avatar performing these actions along that same path can be played back for another user (in that other user's game) as the communication.

For asynchronous communication between avatars of different users, system 300 identifies the location of an avatar of a particular user while that user is playing a game. The location of the avatar can be identified and monitored by modules of the games (e.g., game modules 308 and/or 312) and/or by avatar coordination module 302 (e.g., the games can provide location information for the users to avatar communication module 324). For example, coordinates of the avatar within the game can be tracked (e.g., latitude and longitude coordinates within the game), an area within the game where the avatar is located can be tracked (e.g., a room or building that the avatar is located in, or a sector that the avatar is located in).

Given the location of the avatar of a particular user, as well as the records of the particular locations at which avatars have been left behind by other users, a determination can be readily made (e.g., by avatar communication module 324 or a module of the game) of when the avatar of the particular user is at a same location where an avatar has been left by another user. Whether two avatars are at the same location can be determined in a variety of different manners analogous to the discussion above regarding synchronous communication between avatars of different users.

When an avatar of a particular user is at a same location where an avatar has been left by another user, the avatar that was left by the other user is displayed and can communicate with the avatar of the particular user. The communication by the avatar that was left is the communication that was recorded when the other user left his or her avatar. This communication is referred to as asynchronous because the communication is the communication that was recorded by the other user when his or her avatar was left. The other user need not be playing a game of the same game title as the particular user when the communication is presented to the particular user. Rather, the other user can be playing a different game title, or may not even be online (e.g., may not be logged into a same gaming service as the particular user, such as online gaming service 104 of FIG. 1).

For example, assume user A is playing a game of a particular game title of an online gaming service and that user A and user B are identified as users for which communication between their avatars is allowed. Further assume that user A requests that his or her avatar be left at a particular location. The particular location is recorded, and a communication from player A is also recorded (e.g., an audible communication and gestures). User A then stops playing his or her game. When user B later starts playing his or her own game of the same game title (and user A is no longer logged into the online gaming service) and is identified as being at that particular location, user A's avatar is displayed in user B's game. User B's game plays back the recorded communication (e.g., the audible communication and gestures), including animating user A's avatar to display the recorded gestures and lip movements corresponding to the audible communication. The recorded communication is thus played back from user A's avatar to user B's avatar (and thus also to user B), so user A is able to asynchronously communicate with user B (e.g., providing a tip about an upcoming danger or nearby opportunity, laughing about a nearby object or item, and so forth).

It should be noted that for asynchronous communication between avatars of different users, the different users are running different games of the same game title (at the same or different times). Each user has their own experience with their own game—the two users are not joined into playing the same game.

Additionally, it should be noted that although various discussions herein discuss communication between two users of two different games, the communication between avatars in different games techniques discussed herein can be used to allow any number of users of any number of different games to communicate with one another. For example, synchronous communication among five different users of five different games of the same game title can occur when the five different users are at the same location in their respective games. By way of another example, five different users can leave behind their avatars, providing asynchronous communication from those five different users to another user of the game.

Furthermore, in one more embodiments an avatar of a particular user is allowed to receive communications from avatars of other users only after receiving the consent of the particular user to do so. This user consent can be an opt-in consent, where the user takes an affirmative action (e.g., selection of a radio button, menu item, etc.) to request that his or her avatar be allowed to receive communications from avatars of other users. Alternatively, this user consent can be an opt-out consent, where the user takes an affirmative action (e.g., selection of a radio button, menu item, etc.) to request that his or her avatar not receive communications from avatars of other users. If the user does not choose to opt out of having his or her avatar receive communications from avatars of other users, then it is an implied consent by the user to allow his or her avatar to receive communications from avatars of other users.

Figure 4:
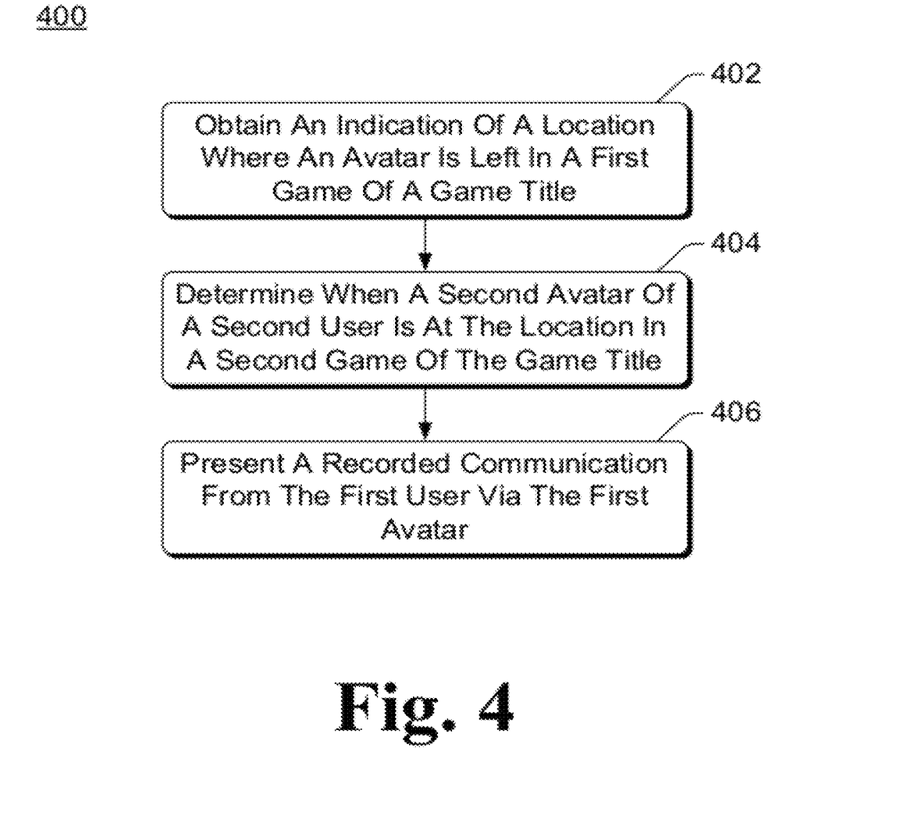
FIG. 4 is a flowchart illustrating an example process for implementing asynchronous communication between avatars of different users in accordance with one or more embodiments.

FIG. 4 is a flowchart illustrating an example process 400 for implementing asynchronous communication between avatars of different users in accordance with one or more embodiments. Process 400 is carried out by a system, such as system 300 of FIG. 3, and can be implemented in software, firmware, hardware, or combinations thereof. Process 400 is shown as a set of acts and is not limited to the order shown for performing the operations of the various acts. Process 400 is an example process for implementing asynchronous communication between avatars of different users; additional discussions of implementing asynchronous communication between avatars of different users are included herein with reference to different figures.

In process 400, an indication of a location where an avatar is left in a first game of a game title is obtained (act 402). The avatar can have been left at a location in response to a user request or at a location identified by a module of the game as discussed above. A record is maintained that includes the location where the avatar is left as well as a communication associated with the avatar that is left (e.g., a recorded audible communication, a gesture, an item, etc.) as discussed above.

A determination is made as to when a second avatar of a second user is at the location in a second game of the game title (act 404). The location in act 404 is the indicated location where an avatar is left behind obtained in act 402. Whether two avatars are at the same location can be determined in a variety of different manners as discussed above. The first and second avatars are located in different games of the same game title, as discussed above.

A recorded communication from the first user is presented via the first avatar in response to the second avatar being at the indicated location (act 406). The recorded communication is the communication associated with the avatar that is left (e.g., an audible communication, a gesture, an item, etc.) as discussed above.

Figure 5:
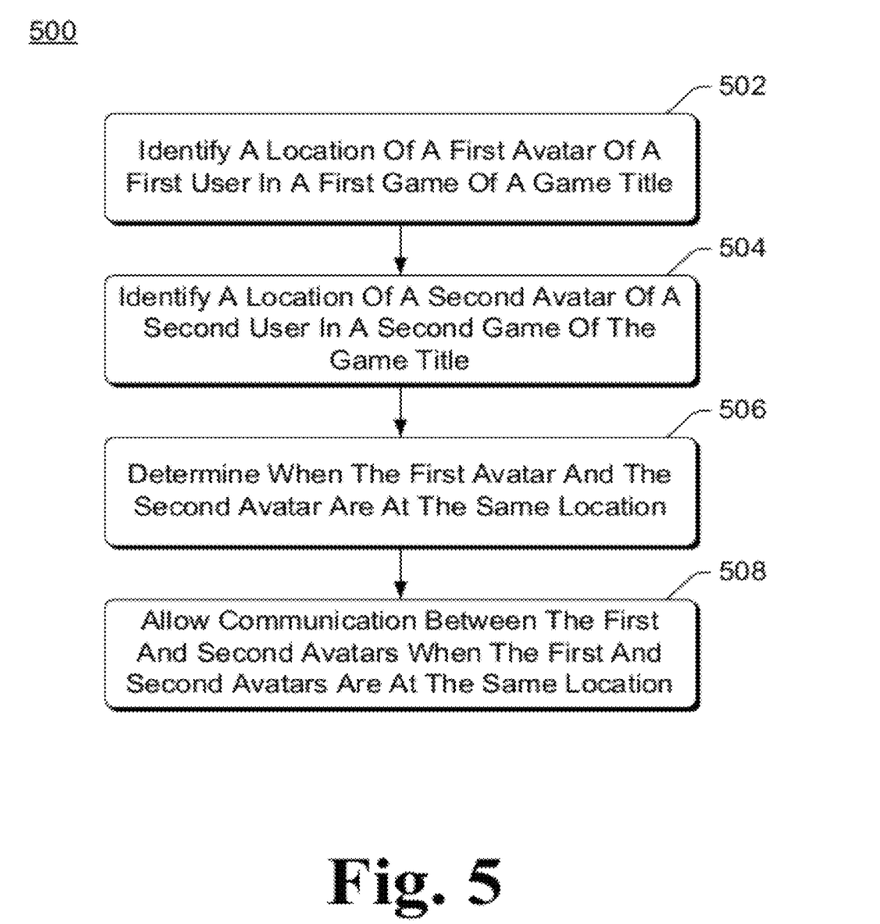
FIG. 5 is a flowchart illustrating an example process for implementing synchronous communication between avatars of different users in accordance with one or more embodiments.

FIG. 5 is a flowchart illustrating an example process 500 for implementing synchronous communication between avatars of different users in accordance with one or more embodiments. Process 500 is carried out by a system, such as system 300 of FIG. 3, and can be implemented in software, firmware, hardware, or combinations thereof. Process 500 is shown as a set of acts and is not limited to the order shown for performing the operations of the various acts. Process 500 is an example process for implementing synchronous communication between avatars of different users; additional discussions of implementing synchronous communication between avatars of different users are included herein with reference to different figures.

In process 500, a location of a first avatar of a first user in a first game of a game title is identified (act 502), and a location of a second avatar of a second user in a second game of the game title is identified (act 504). The first and second avatars are located in different games of the same game title, as discussed above.

A determination is made as to when the first avatar and the second avatar are at the same location (act 506). Whether two avatars are at the same location can be determined in a variety of different manners as discussed above.

Communication between the first avatar and the second avatar is allowed only when the first avatar and the second avatar are at the same location (act 508). The communication between the first and second avatars can take various forms, such as audible communications, gestures, transferring items, and so forth, as discussed above.

Various actions such as communicating, receiving, storing, generating, obtaining, and so forth performed by various modules are discussed herein. It should be noted that the various modules can cause such actions to be performed. A particular module causing an action to be performed includes that particular module itself performing the action, or alternatively that particular module invoking or otherwise accessing another component or module that performs the action (or performs the action in conjunction with that particular module).

Figure 6:
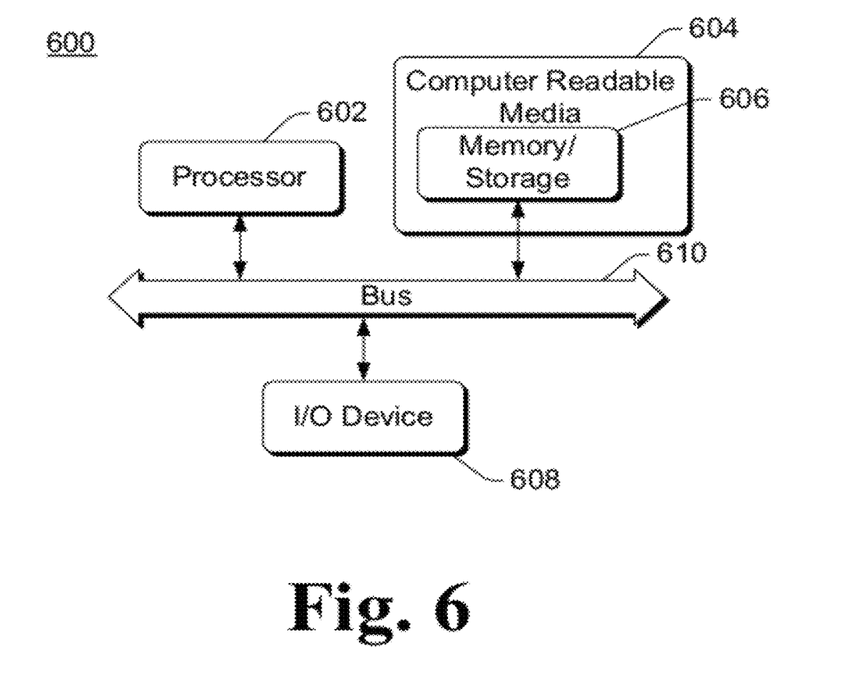
FIG. 6 illustrates an example computing device that can be configured to implement the communication between avatars in different games in accordance with one or more embodiments.

FIG. 6 illustrates an example computing device 600 that can be configured to implement the communication between avatars in different games in accordance with one or more embodiments. Computing device 600 can, for example, be a gaming device 102 of FIG. 1, implement at least part of online gaming service 104 of FIG. 1, be a gaming device 202 of FIG. 2, or implement at least part of system 300 of FIG. 3.

Computing device 600 includes one or more processors or processing units 602, one or more computer readable media 604 which can include one or more memory and/or storage components 606, one or more input/output (I/O) devices 608, and a bus 610 that allows the various components and devices to communicate with one another. Computer readable media 604 and/or one or more I/O devices 608 can be included as part of, or alternatively may be coupled to, computing device 600. Bus 610 represents one or more of several types of bus structures, including a memory bus or memory controller, a peripheral bus, an accelerated graphics port, a processor or local bus, and so forth using a variety of different bus architectures. Bus 610 can include wired and/or wireless buses.

Memory/storage component 606 represents one or more computer storage media. Component 606 can include volatile media (such as random access memory (RAM)) and/or non-volatile media (such as read only memory (ROM), Flash memory, optical disks, magnetic disks, and so forth). Component 606 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 602. It is to be appreciated that different instructions can be stored in different components of computing device 600, such as in a processing unit 602, in various cache memories of a processing unit 602, in other cache memories of device 600 (not shown), on other computer readable media, and so forth. Additionally, it is to be appreciated that the location where instructions are stored in computing device 600 can change over time.

One or more input/output devices 608 allow a user to enter commands and information to computing device 600, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, applications, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 6. The features of the communication between avatars in different games techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-gaming method, comprising:
communicating with a first instance of a game title associated with a first user and a second instance of the game title associated with a second user, the first user controlling a representation of the first user in the first instance and the second user controlling a representation of the second user in the second instance, where each game instance includes a same plurality of different locations, and each representation moves throughout the plurality of different locations responsive to user control;
receiving a request from the first instance of the game title to leave a copy of the representation of the first user at a selected location of the plurality of different locations, the request specifying an action to be performed by the representation at a subsequent time; and
responsive to the representation of the second user moving to the selected location, instructing the second instance of the game title to display the copy of the representation of the first user performing the specified action.

2. A method as recited in claim 1, the selected location comprising a location of the representation of the first user in the first instance when the request is received.

3. A method as recited in claim 1, further comprising only displaying the copy of the representation of the first user if the first user is identified as one of multiple users in a social graph of the second user.

4. A method as recited in claim 1, the specified action comprising playing a communication previously recorded when the first user was playing the first instance.

5. A method as recited in claim 1, the specified action comprising one or more physical gestures, and the copy of the representation of the first user is displayed performing the one or more physical gestures.

6. A method as recited in claim 1, the specified action comprising a transferring of an item from the copy of the representation of the first user to the representation of the second user.

7. A method as recited in claim 1, the specified action comprising actions that the representation of the first user performed along a path of the first instance, and the copy of the representation of the first user is displayed performing the actions along an equivalent path of the second instance.

8. A method as recited in claim 1, wherein the representation of the second user is determined to be at the selected location when a location of the representation of the second user in the second instance is within a threshold distance of the selected location.

9. A method as recited in claim 1, the second user being logged into an online gaming service, and the copy of the representation of the first user is displayed when the first user is not logged into the online gaming service.

10. A method as recited in claim 1, wherein the copy of the representation of the first user is displayed when the first user is playing a game of a different game title.

11. A computer-gaming method, comprising:
communicating with a first game of a game title associated with a first user and a second game of the game title associated with a second user, the first user controlling a representation of the first user in the first game and the second user controlling a representation of the second user in the second game, where each game includes a plurality of different locations, and each representation moves throughout the plurality of different locations responsive to user control;
obtaining an indication of a selected location in the first game of the game title where a copy of the representation of the first user is left behind;
determining when the representation of the second user is at the selected location in the second game of the game title, the first user being identified as one of multiple users in a social graph of the second user; and
presenting, in the second game in response to determining that the representation of the second user is at the selected location, a recorded communication from the first user via the copy of the representation of the first user, the recorded communication including an audible communication, one or more physical gestures, and a transferring of an item, the presenting further comprising:
playing back the audible communication;
displaying the copy of the representation of the first user performing the one or more physical gestures; and
transferring the item from the copy of the representation of the first user to the representation of the second user.

12. A gaming device comprising:
one or more processors; and
a coordination module configured to:
communicate with a first computing device associated with a first user and executing a first game of a game title and a second computing device associated with a second user and executing a second game of the game title, the first user controlling a representation of the first user in the first game and the second user controlling a representation of the second user in the second game, where each game includes a plurality of different locations, and each representation moves throughout the plurality of different locations responsive to user control;
obtain an indication of a selected location in the first game of the game title where a copy of the representation of the first user is left;
determine when the representation of the second user is at the selected location in the second game of the game title; and
playing back, in the second game in response to determining that the representation of the second user is at the selected location, a recorded audible communication from the first user via the copy of the representation of the first user.

13. The gaming device as recited in claim 12, the indication obtained from an online gaming service.

14. The gaming device as recited in claim 12, the selected location comprising a location of the representation of the first user in the first instance when a user request to have the copy of the representation of the first user left is received.

15. The gaming device as recited in claim 12, the recorded audible communication comprising an audible communication previously recorded when the first user was playing the first instance.

16. The gaming device as recited in claim 15, the recorded audible communication accompanied by the copy of the representation of the first user performing one or more physical gestures.

17. The gaming device as recited in claim 15, the recorded audible communication accompanied by the copy of the representation of the first user transferring an item to the representation of the second user.

18. The gaming device as recited in claim 15, the recorded audible communication accompanied by actions that the representation of the first user performed along a path of the first instance.

19. The gaming device as recited in claim 12, the second user being logged into an online gaming service, the playing back comprising playing back the recorded audible communication when the first user is not logged into the online gaming service.

20. The gaming device as recited in claim 12, the playing back comprising playing back the recorded audible communication when the first user is playing a game of a different game title.

* * * * *